W. S. Pratt,
Anti-Friction Roller.
Nº 23,704.          Patented Apr. 19, 1859.
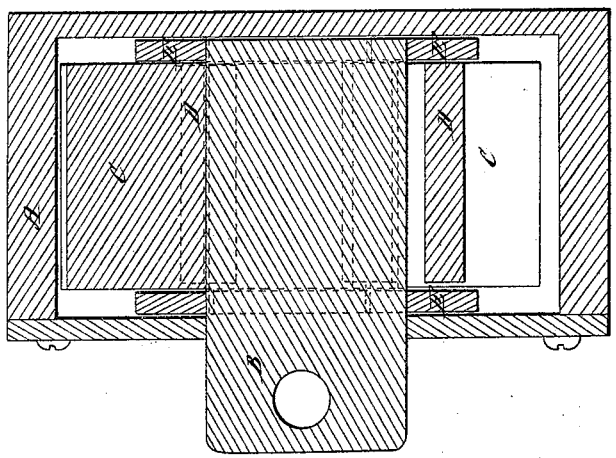
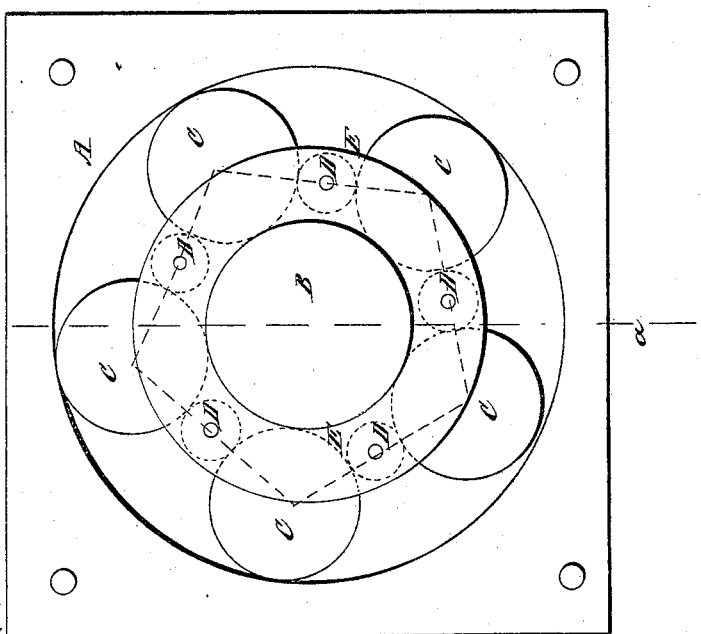
Witnesses
William Hughes
William H. Conklin
Inventor
William S. Pratt

UNITED STATES PATENT OFFICE.

WILLIAM S. PRATT, OF BROOKLYN, NEW YORK.

JOURNAL-BOX.

Specification of Letters Patent No. 23,704, dated April 19, 1859.

*To all whom it may concern:*

Be it known that I, WILLIAM S. PRATT, of the city of Brooklyn, county of Kings, and State of New York, have invented a new and useful Box for Running-Journals, called a "Central pressure-box for journals;" and I do hereby declare that the following is a full, clear, and exact description of the construction and operation of the same, reference being had to the annexed drawings, making a part of this specification, wherein—

Figure 1, is a side elevation of my box for journals with the cap plate removed, and Fig. 2, is a vertical section of said journal and box at the line $a, a$, Fig. 1.

The construction and operation of this journal box is as follows: I construct a box "A," in the ordinary form used for journals, say, for a two-inch journal B, I construct box A, six inches square and four inches deep; I then form a circular recess five inches in diameter and four inches deep; I then construct cylinder "C," one and a half inches in diameter and three and a half inches long, which I place five in number in said recess; I then construct five cylinders, "D" five-eighths of an inch in diameter and four inches long, which I place in said recess, between cylinders "C" in a line, between their centers; in the ends of cylinder "D," I place a center pin, one-eighth of an inch in diameter, and one quarter of an inch long; I then construct ring "E," three inches in diameter, and one quarter of an inch thick, with a recess through its center of two inches, said ring "E" receives the pins or centers of cylinder "D," said ring revolving around center "B;" said cylinder "D" keeping cylinders "C" at an equal distance from each other and transmitting the pressure of center "B" equally to cylinder "C," in the manner and for the purpose specified.

I am well aware that antifriction journal boxes have been formed with rollers on gudgeons or shafts in a ring, also with smaller intermediate rollers between the main rollers that are formed of elastic material, but in all these instances the weight on the axle tends to press down between two rollers and then roll over these rollers successively, which operation causes wear and friction upon the journals; and if intermediate rollers are used the pressure thrown upon the whole series by the journal acting to separate the lowest pair, brings the cylindrical surfaces to bear against each other at an inclination, in such a manner that the intermediate roller is pressed outwardly against its bearings or shaft causing friction; my invention as distinguished from these relating to placing the intermediate roller so that the surfaces bear tangentially against each other, whereby the intermediate roller has no pressure sidewise on its journals or shaft, as will be seen by the red lines drawn from center to center of the rollers $c, c$, said line also passing through the center of the intermediates D, D, so that the surfaces bear upon and roll against each other without any lateral pressure tending to displace the rollers D, or cause friction in their bearings.

What I claim as my invention and desire to secure by Letters Patent is—

The rollers D, D, placed between the rollers $c, c$, in the position and for the purposes specified.

WILLIAM S. PRATT.

Witnesses:
WILLIAM HUGHES,
WILLIAM H. CONKLIN.